BURCHFIELD & BROCK.
Carriage Shaft.
No. 106,542. Patented Aug. 23, 1870.
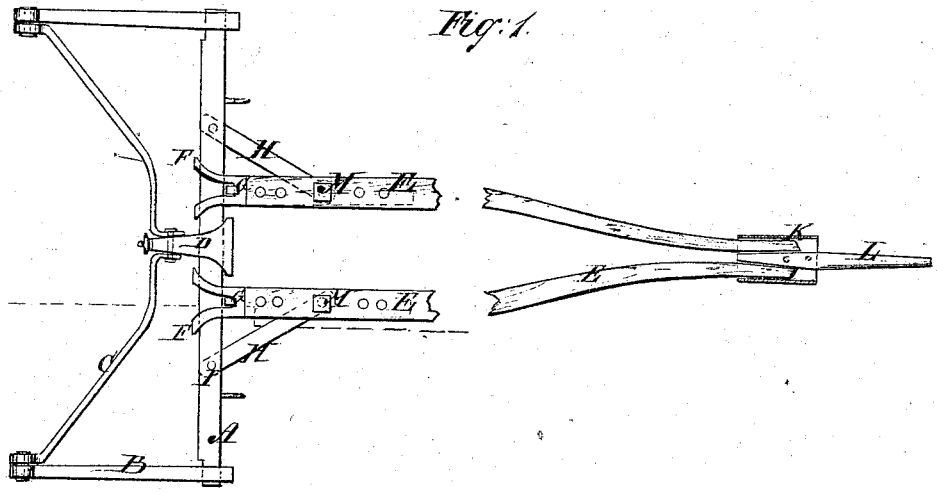
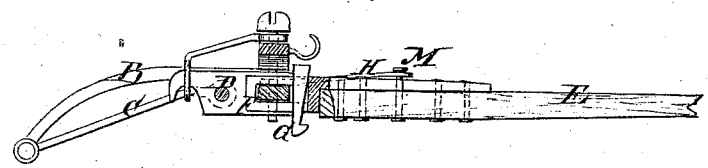

United States Patent Office.

JOHN G. BURCHFIELD AND SETH W. BROCK, OF NIANTIC, ILLINOIS, ASSIGNORS TO SETH W. BROCK.

Letters Patent No. 106,542, dated August 23, 1870.

IMPROVEMENT IN COMBINATION OF SHAFTS AND POLE.

The Schedule referred to in these Letters Patent and making part of the same.

*To all whom it may concern:*

Be it known that we, JOHN G. BURCHFIELD and SETH W. BROCK, of Niantic, in the county of Macon and State of Illinois, have invented a new and useful Improvement in Combined Shafts and Pole; and we do hereby declare that the following is a full, clear, and exact description thereof, which will enable others skilled in the art to make and use the same, reference being had to the accompanying drawing forming part of this specification.

This invention relates to improvements in buggies and other light wagons; and consists in an arrangement of shafts so that they may be used as a pole also, by slightly shifting them, thereby saving the expense of a separate pole, and the labor of detaching one and attaching the other.

Figure 1 is a plan of the bottom of our improved combined shafts and pole, and

Figure 2 is a section on the line $x\ x$.

Similar letters of reference indicate corresponding parts.

A is a bar for the attachment of the shafts to the axle, and to which the whiffletree is to be attached. It is connected to the axle by the iron bars B, and by the braces C, and center piece D.

E represents the shafts, which are attached to this bar A by the crotched bars F, bent around the said bar, and having the tightening-keys G, for clamping them to the bar, so as to hold at any point thereon.

The shafts are also connected to the bar A by the braces H, which are pivoted at I to the bar, so as to turn or oscillate thereon.

When the shafts are to be used as a pole, they are brought to the position represented in the drawing, so that the front ends come together. These are placed in a case or box, K, open at both ends, and an extension, L, is fitted to them, as shown, or it may be by any other suitable means. This arrangement makes a pole which is as serviceable in every respect as those made in the common way, and the whiffletree of the shafts is made the evener for the pole by making it strong, and arranging it for attaching other whiffletrees.

The adjustment for using the shafts as such is made by detaching the case K, and the extension L, and moving the shafts as far apart as the bar A will admit, the braces H being first detached at M, and turning them outward, and again attaching them.

Having thus described our invention,

We claim as new, and desire to secure by Letters Patent—

1. The arrangement of the shafts of a buggy for adjustment together for use as a pole, substantially in the manner described.

2. The combination with the bar A, and the shafts, of the bars F, keys G, and braces H, all substantially as specified.

3. The combination with the shafts, of the case K, and extension L, all substantially as specified.

JOHN G. BURCHFIELD.
SETH W. BROCK.

Witnesses:
THOS. A. PRITCHETT,
THOMAS M. RILEY.